US008564267B2

(12) United States Patent
Latham, II et al.

(10) Patent No.: US 8,564,267 B2
(45) Date of Patent: Oct. 22, 2013

(54) MULTI-MODE PARAMETER ANALYZER FOR POWER SUPPLIES

(75) Inventors: Paul Walker Latham, II, Lee, NH (US); Mansur Kiadeh, Cupertino, CA (US); Siwas Chandhrasi, San Jose, CA (US); Stewart Gall Kenly, Epping, NH (US); Andras Fekete, Lee, NH (US)

(73) Assignee: Maxim Integrated Products, Inc., San Jose, CA (US)

( * ) Notice: Subject to any disclaimer, the term of this patent is extended or adjusted under 35 U.S.C. 154(b) by 124 days.

(21) Appl. No.: 13/219,165

(22) Filed: Aug. 26, 2011

(65) Prior Publication Data

US 2013/0049723 A1    Feb. 28, 2013

(51) Int. Cl.
 *G05F 1/00*    (2006.01)
(52) U.S. Cl.
 USPC .......................................... 323/283; 323/285
(58) Field of Classification Search
 USPC ......... 323/282–286, 222–225, 268, 271, 351, 323/275; 363/21.05, 127; 327/104–108; 700/297, 298; 324/764.01
 See application file for complete search history.

(56) References Cited

U.S. PATENT DOCUMENTS

| 6,581,086 | B1 * | 6/2003 | Morrison et al. | 708/523 |
| 2004/0155637 | A1 * | 8/2004 | Chapuis | 323/282 |
| 2007/0042729 | A1 * | 2/2007 | Baaman et al. | 455/127.1 |
| 2007/0236200 | A1 * | 10/2007 | Canfield et al. | 323/284 |
| 2010/0127681 | A1 * | 5/2010 | Kenly et al. | 323/282 |

* cited by examiner

*Primary Examiner* — Timothy J Dole
*Assistant Examiner* — Carlos Rivera-Perez

(57) ABSTRACT

A system includes an input selection module, a multiplier selection module, a multiplier module, an adding module, a plurality of accumulators, and an estimation module. The input selection module selects input signals including a duty cycle signal and current and voltage signals of a power supply. The multiplier selection module selects inputs from sine and cosine generator. The multiplier module multiplies the selected input signals by the inputs from the sine and cosine generator to generate products. The adding module adds the products to generate sums. The plurality of accumulators accumulates the sums. The estimation module estimates values of a plurality of components including an inductance, a capacitance, and a resistance of the power supply based on the sums accumulated in the plurality of accumulators.

15 Claims, 13 Drawing Sheets

| Mode | Function |
|---|---|
| 0 | Filtered read back of PMBus: allows for monitoring key signals simultaneously |
| 1 | Measures complex vout/duty at test frequency with error analysis |
| 2 | Measures complex vind/iind and vout/iind: allows for measuring L, C, ESR & Rdamp |
| 3 | Measures complex vind/iind with error analysis: allows for measuring L & Rdamp |
| 4 | Measures complex vcap/iind with error analysis |
| 5 | Measures complex vout/iload & vout/iind: allows for measuring output impedance |
| 6 | Measures estimated ripple of key signals |
| 7 | Transient error analysis |

FIG. 2C

| Mode | Function | acc1 | acc2 | acc3 | acc4 | acc5 | acc6 |
|---|---|---|---|---|---|---|---|
| 0 | Filtered read back | duty | vout | iind | duty*iind | vin | iload |
| 1 | Two freq analysis | (dutyv-vtarg)*sin | (dutyv-vtarg)*cos | (vout-vtarg)*sin | (vout-vtarg)*sin | (dutyv-vtarg)^2 | (vout-vtarg)^2 |
| 2 | One freq method | (dutyv-vout)*sin | (dutyv-vout)*cos | iind*sin | (vout-vtarg)*cos | (vout-vtarg)*sin | (vout-vtarg)*cos |
| 3 | L & Rdamp | (dutyv-vout)*sin | (dutyv-vout)*cos | iind*sin | iind*cos | iind^2 | (dutyv-vout)^2 |
| 4 | C & Rcap | iind*sin | iind*cos | (vout-vtarg)*sin | (vout-vtarg)*cos | iind^2 | (vout-vtarg)^2 |
| 5 | Zout analysis | iind*sin | iind*cos | (vout-vtarg)*sin | (vout-vtarg)*cos | iload*sin | iload*cos |
| 6 | Ripple analysis | vin | duty | abs(voutripple) | iind | abs(iindriple) | (vout-vtarg)^2 |
| 7 | Transient analysis | iind^2 | (vout-vtarg)^2 | (dutyv-vtarg)^2 | (vout-vcmd)^2 | (vout-vtarg) | (iload-iind)^2 |

FIG. 2D $$acc_1 = \sum_0^{timer-delay} duty \quad \text{Average duty cycle}$$

$$acc_2 = \sum_0^{timer-delay} vout \quad \text{Average output voltage}$$

$$acc_3 = \sum_0^{timer-delay} icur \quad \text{Average inductor current}$$

$$acc_4 = \sum_0^{timer-delay} duty\ icur \quad \text{Approximate average input current}$$

$$acc_5 = \sum_0^{timer-delay} vinadc \quad \text{Average input voltage}$$

$$acc_6 = \sum_0^{timer-delay} lcffadc \quad \text{Average load current}$$

$$icur = \begin{bmatrix} dcradc \\ iind \end{bmatrix}$$

FIG. 3A

$$H(w_1) = \frac{vout(w_1)}{dutyv(w_1)} = \frac{acc_3 + j\,acc_4}{acc_1 + j\,acc_2} e^{T_{cmp}T_s w_1}$$

$$dutyv_{error}(w_1) = \sqrt{acc_5} - \sqrt{acc_1^2 + acc_2^2}$$

$$vout_{error}(w_1) = \sqrt{acc_6} - \sqrt{acc_3^2 + acc_4^2}$$

$$\begin{bmatrix} 1 & 0 & \text{Im}(H(w_1))w_1 & \text{Re}(H(w_1))w_1^2 \\ 0 & w_1 & -\text{Re}(H(w_1))w_1 & \text{Im}(H(w_1))w_1^2 \\ 1 & 0 & \text{Im}(H(w_2))w_2 & \text{Re}(H(w_2))w_2^2 \\ 0 & w_2 & -\text{Re}(H(w_2))w_2 & \text{Im}(H(w_2))w_2^2 \end{bmatrix} \begin{bmatrix} a_1 \\ a_2 \\ b_1 \\ b_2 \end{bmatrix} = \begin{bmatrix} \text{Re}(H(w_1)) \\ \text{Im}(H(w_1)) \\ \text{Re}(H(w_2)) \\ \text{Im}(H(w_2)) \end{bmatrix}$$

$$H(s) = \frac{a_2 s + a_1}{b_2 s^2 + b_1 s + 1}$$

$$wn = \frac{1}{\sqrt{b_1}} \quad \xi = \frac{b_1}{2b_2 wn} \quad wz = \frac{a_1}{a_2} \quad Kdc = a_1$$

$$H(s) = \frac{Kdc\left(\dfrac{s}{wz} + 1\right)}{\dfrac{s^2}{wn^2} + \dfrac{2\xi s}{wn} + 1}$$

FIG. 3C

$$acc_1 = \sum_0^{timer-delay} (dutyv - vt\,arg)\sin$$

$$acc_2 = \sum_0^{timer-delay} (dutyv - vt\,arg)\cos$$

$$acc_3 = \sum_0^{timer-delay} (vout - vt\,arg)\sin$$

$$acc_4 = \sum_0^{timer-delay} (vout - vt\,arg)\cos$$

$$acc_5 = \sum_0^{timer-delay} (dutyv - vt\,arg)^2$$

$$acc_6 = \sum_0^{timer-delay} (vout - vt\,arg)^2$$

FIG. 3B

$$acc_1 = \sum_0^{timer-delay} (dutyv - vout)\sin$$

$$acc_2 = \sum_0^{timer-delay} (dutyv - vout)\cos$$

$$acc_3 = \sum_0^{timer-delay} icur\sin$$

$$acc_4 = \sum_0^{timer-delay} icur\cos$$

$$acc_5 = \sum_0^{timer-delay} (vout - vt\arg)\sin$$

$$acc_6 = \sum_0^{timer-delay} (vout - vt\arg)\cos$$

$$icur = \begin{bmatrix} dcradc \\ iind \end{bmatrix}$$

FIG. 3D

$$Z_{ind}(w) = \frac{V_{ind}(w)}{I_{ind}(w)} = \frac{acc_1 + jacc_2}{acc_3 + jacc_4} e^{T_{comp}T_s w_1}$$

$$Z_{cap}(w) = \frac{V_{out}(w)}{I_{ind}(w)} = \frac{acc_5 + jacc_6}{acc_3 + jacc_4}$$

$$L = \frac{\text{Im}(Z_{ind})}{2\pi w} \quad R_{damp} = \text{Re}(Z_{ind})$$

$$C = \frac{-1}{2\pi w \text{Im}(Z_{cap})} \quad R_{cap} = \text{Re}(Z_{cap})$$

FIG. 3E

$$Z_{ind}(w) = \frac{V_{ind}(w)}{I_{ind}(w)} = \frac{acc_1 + j\,acc_2}{acc_3 + j\,acc_4} e^{T_{comp}T_s w_1}$$

$$L = \frac{\text{Im}(Z_{ind})}{2\pi w} \qquad R_{damp} = \text{Re}(Z_{ind})$$

$$icur_{error}(w) = \sqrt{acc_5} - \sqrt{acc_1^2 + acc_2^2}$$

$$vind_{error}(w) = \sqrt{acc_6} - \sqrt{acc_3^2 + acc_4^2}$$

FIG. 3G

$$acc_1 = \sum_0^{timer-delay}(dutyv - vout)\sin$$

$$acc_2 = \sum_0^{timer-delay}(dutyv - vout)\cos$$

$$acc_3 = \sum_0^{timer-delay} icur \sin$$

$$acc_4 = \sum_0^{timer-delay} icur \cos$$

$$acc_5 = \sum_0^{timer-delay} icur^2$$

$$acc_6 = \sum_0^{timer-delay}(dutyv - vout)^2$$

$$icur = \begin{bmatrix} dcradc \\ iind \end{bmatrix}$$

FIG. 3F

$$Z_{cap}(w) = \frac{V_{out}(w)}{I_{ind}(w)} = \frac{acc_3 + j\,acc_4}{acc_1 + j\,acc_2} \quad R_{cap} = \text{Re}(Z_{cap})$$

$$C = \frac{-1}{2\pi w \,\text{Im}(Z_{cap})}$$

$$icur_{error}(w_1) = \sqrt{acc_5} - \sqrt{acc_3^2 + acc_4^2}$$

$$vout_{error}(w_1) = \sqrt{acc_6} - \sqrt{acc_1^2 + acc_2^2}$$

FIG. 3I

$$acc_1 = \sum_0^{timer-delay} icur \sin$$

$$acc_2 = \sum_0^{timer-delay} icur \cos$$

$$acc_3 = \sum_0^{timer-delay} (vout - vt\,\text{arg})\sin$$

$$acc_3 = \sum_0^{timer-delay} (vout - vt\,\text{arg})\cos$$

$$acc_5 = \sum_0^{timer-delay} icur^2$$

$$acc_6 = \sum_0^{timer-delay} (vout - vt\,\text{arg})^2$$

$$icur = \left[\frac{dcradc}{iind}\right]$$

FIG. 3H

$$acc_1 = \sum_{0}^{timer-delay} icur \sin$$

$$acc_2 = \sum_{0}^{timer-delay} icur \cos$$

$$acc_3 = \sum_{0}^{timer-delay} (vout - vt\,\arg)\sin$$

$$acc_3 = \sum_{0}^{timer-delay} (vout - vt\,\arg)\cos$$

$$acc_5 = \sum_{0}^{timer-delay} lcffadc \sin$$

$$acc_6 = \sum_{0}^{timer-delay} lcffadc \cos$$

$$icur = \begin{bmatrix} dcradc \\ iind \end{bmatrix}$$

FIG. 3J

$$Z_{load}(w) = \frac{V_{out}(w)}{I_{ind}(w)} = \frac{acc_3 + j\,acc_4}{acc_1 + j\,acc_2}$$

$$Z_{out}(w) = \frac{V_{out}(w)}{I_{lcffadc}(w)} = \frac{acc_3 + j\,acc_4}{acc_5 + j\,acc_6}$$

$$|V_{out}| = \sqrt{acc_3^2 + acc_4^2}$$

$$|I_{out}| = \sqrt{acc_5^2 + acc_6^2}$$

$$|V_{ind}| = \sqrt{acc_1^2 + acc_2^2}$$

FIG. 3K

$$acc_1 = \sum_0^{timer-delay} vin \qquad \text{Average input voltage}$$

$$acc_2 = \sum_0^{timer-delay} duty \qquad \text{Average duty cycle}$$

$$acc_3 = \sum_0^{timer-delay} |vout_{ripple}| \qquad \text{Average output voltage ripple from ripple estimator, requires measureable ripple}$$

$$acc_4 = \sum_0^{timer-delay} icur \qquad \text{Average inductor current}$$

$$acc_5 = \sum_0^{timer-delay} |dcradc_{ripple}| \qquad \text{Average inductor current ripple from dcradc, requires correct Tmax}$$

$$acc_6 = \sum_0^{timer-delay} (vout - vt\,\text{arg})^2 \qquad \text{Sqrt}(acc_6) \text{ is rms output voltage error}$$

$$icur = \left\lceil \frac{dcradc}{iind} \right\rceil$$

FIG. 3L

$$acc_1 = \sum_0^{timer-delay} icur^2 \qquad \text{Sqrt}(acc_1) \text{ is rms inductor current}$$

$$acc_2 = \sum_0^{timer-delay} (vout - vt\,\text{arg})^2 \qquad \text{Sqrt}(acc_2) \text{ is rms output voltage error}$$

$$acc_3 = \sum_0^{timer-delay} (dutyv - vt\,\text{arg})^2 \qquad \text{Sqrt}(acc_3) \text{ is rms output duty cycle error}$$

$$acc_4 = \sum_0^{timer-delay} (vout - vt\,\text{arg} - paout)^2 \qquad \text{Sqrt}(acc_4) \text{ is rms command following error}$$

$$acc_5 = \sum_0^{timer-delay} (vout - vt\,\text{arg}) \qquad \text{Average output voltage}$$

$$acc_6 = \sum_0^{timer-delay} (lcffadc - icur)^2 \qquad \text{Sqrt}(acc_6) \text{ is rms current error}$$

$$icur = \begin{bmatrix} dcradc \\ iind \end{bmatrix}$$

FIG. 3M

MULTI-MODE PARAMETER ANALYZER FOR POWER SUPPLIES

CROSS-REFERENCE TO RELATED APPLICATIONS

This application is related to U.S. patent application Ser. No. 12/622,484 filed on Nov. 20, 2009, which claims priority to U.S. Provisional Application No. 61/116,897 filed on Nov. 21, 2008. The disclosures of the above applications are incorporated herein by reference in their entirety.

FIELD

The present disclosure relates generally to power supplies and more particularly to a multi-mode parameter analyzer for power supplies.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Feedback control systems in general, and for power supplies in particular, have performance and stability limitations caused by unknown component values and variations in the component values. Accurate measurements of several key system parameters including the component values are necessary to achieve high-speed transient performance.

For example, in the case of power supplies, the output capacitance may be largely unknown since the power supply load has a capacitance that is in parallel to power supply output capacitance. Commonly, the load capacitance is in the form of a capacitance added to the load circuit to improve high-frequency characteristics. Unfortunately, the unknown load capacitance and possibly other components with significant tolerances are common occurrences in power supplies.

A similar problem can occur in motor control systems, for example, where the motor torque constant and the load inertia are generally not known with sufficient accuracy to allow for high-speed control of the motor. Measuring these unknown parameters allows for their compensation.

SUMMARY

A system comprises an input selection module, a multiplier selection module, a multiplier module, an adding module, a plurality of accumulators, and an estimation module. The input selection module selects a plurality of input signals from a power supply based on a first set of control signals. The input signals include a duty cycle signal and a plurality of current and voltage signals of the power supply. The multiplier selection module selects inputs from a sine generator and a cosine generator based on a second set of control signals. The multiplier module selectively multiplies one or more of the selected input signals by one of the inputs from the sine generator and the cosine generator to generate products. The adding module selectively adds the products to generate sums. The plurality of accumulators accumulates the sums based on the second set of control signals. The estimation module generates the first and second sets of control signals and that estimates values of a plurality of components including an inductance, a capacitance, and a resistance in an output stage of the power supply based on the sums accumulated in the plurality of accumulators.

A method comprises selecting a plurality of input signals from a power supply based on a first set of control signals, where the input signals include a duty cycle signal and a plurality of current and voltage signals of the power supply. The method further comprises selecting inputs from a sine generator and a cosine generator based on a second set of control signals. The method further comprises selectively multiplying one or more of the selected input signals by one of the inputs from the sine generator and the cosine generator to generate products. The method further comprises selectively adding the products to generate sums and accumulating the sums in a plurality of accumulators selected based on the second set of control signals. The method further comprises estimating values of a plurality of components including an inductance, a capacitance, and a resistance in an output stage of the power supply based on the sums accumulated in the plurality of accumulators.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 2C is a table depicting modes of operation of the parameter analyzer module;

FIG. 2D is a table depicting values accumulated in accumulators of the parameter analyzer module in different modes;

FIGS. 3A-3M depict equations used by the parameter analyzer module in different modes.

DETAILED DESCRIPTION

Figure 1:
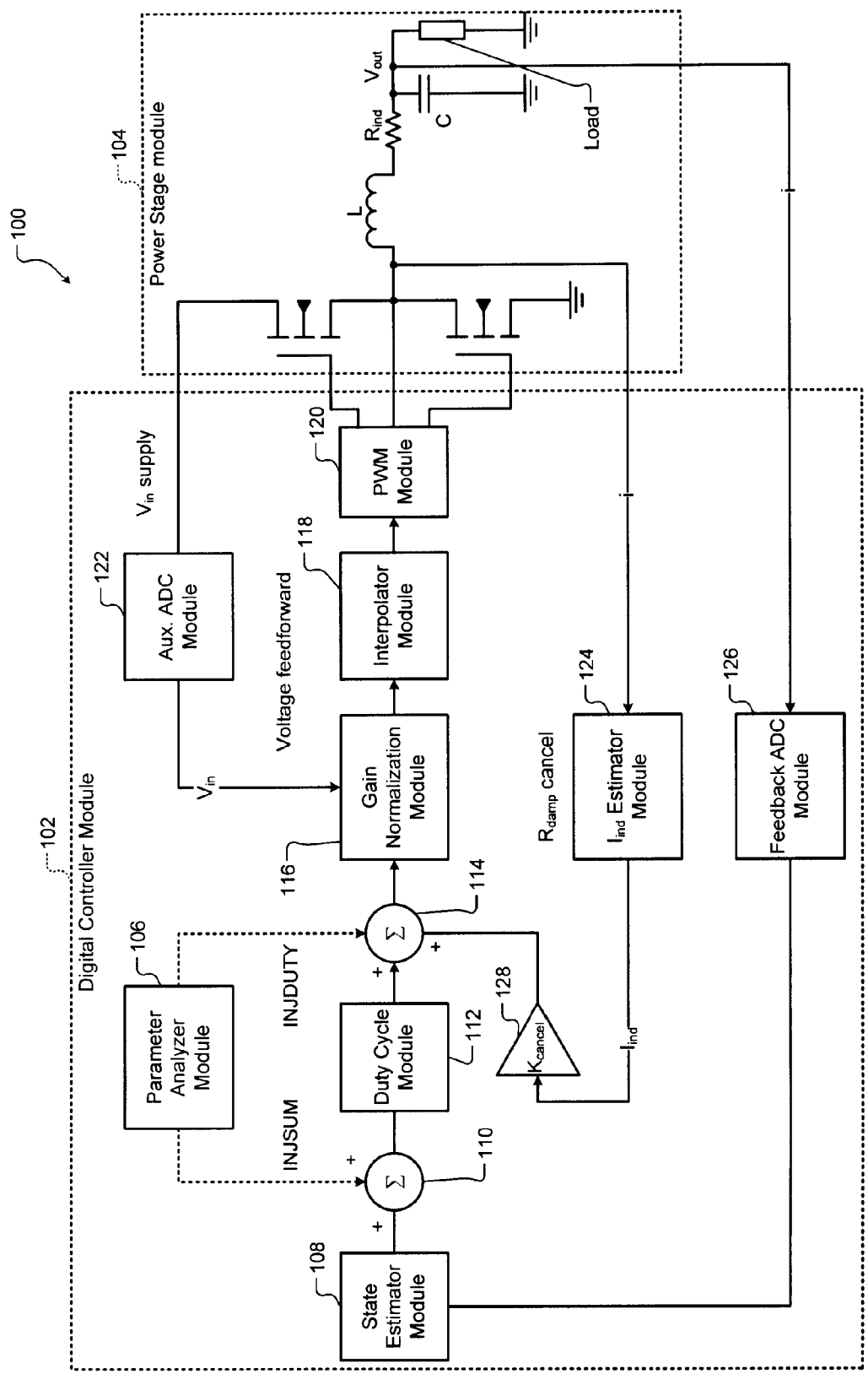
FIG. 1 is a functional block diagram of a switching power supply.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a systemon-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure relates to a multi-purpose data acquisition and analysis system for DC-to-DC switch-mode power supplies with digital controllers. The system allows for remote and in-manufacturing testing of power supplies. The system adaptively determines values of power supply components (e.g., L, C, and R) and gains of the digital controller. The system allows for independent measurement of power supply components and improves robustness by estimating measurement errors. The system uses sine/cosine or square waves for measurements and provides multiple modes of operation for a variety of measurements and analyses of power supply parameters. The system provides filtered monitoring of key power supply parameters and error analysis of closed loop operation. The system allows for both adaptive compensation and filtered read-back of the power supply parameters via a power management bus (PMbus). The system uses a filter bank with signal injection and coherent demodulation to measure complex gains, average values, and squared errors.

More specifically, the system includes a multiply-and-accumulate (MAC) module with sine and cosine lookup tables for multi-signal complex demodulation. The MAC module is used for simultaneous monitoring of $V_{out}$, $V_{in}$, inductor current, duty cycle, estimated input current, and other power supply parameters. Additionally, the MAC module is used for measuring power stage components (e.g., L, C, R, etc.), closed and open loop response to square wave stimulus, output impedance, etc.

Referring now to FIG. 1, a switching power supply 100 includes a digital controller module 102 and a power stage module 104. The digital controller module 102 includes a parameter analyzer module 106, a state estimator module 108, a summing module 110, a duty cycle module 112, and a summing module 114, a gain normalization module 116, an interpolator module 118, a pulse width modulation (PWM) module 140, an auxiliary analog-to-digital converter (ADC) module 142, an inductor current ($l_{ind}$) estimator module 144, and a feedback ADC module 146.

The power stage module 104 includes a high-side switch connected in series to a low-side switch (collectively switches). The series combination of the switches is connected across a supply voltage $V_{in}$ and ground as shown. An inductor L is connected to a junction of the switches, where $R_{ind}$ is a resistance of the inductor L. A capacitor C and a load are connected in parallel to each other. The parallel combination of the capacitor C and the load is connected in series to the inductor L as shown.

The power stage module 104 generates an output voltage $V_{out}$. At least the output voltage and inductor current are fed back from the power stage module 104 to the digital controller module 102. The digital controller module 102 controls the power stage module 104 based on the feedback.

The parameter analyzer module 106 analyzes the feedback, measures various component values, and performs adaptive compensation of various power supply parameters. The parameter analyzer module 106 measures the component values by injecting a stimulus signal into the summing module 110 before duty cycle determination and by measuring the input and output of the power supply. Alternatively, the parameter analyzer module 106 measures the component values by injecting the stimulus signal into the summing module 114 after duty cycle determination and by measuring the input and output of the power supply. The parameter analyzer module 106 determines whether to inject the stimulus signal into the summing module 110 or the summing module 114 depending on noise.

The state estimator module 108 estimates switch states of the power stage module 104. For example, in buck topology, the switch states include charging, discharging, and tri-state. In buck-boost topology, the switch states include buck, boost, buck-boost, short across the inductor, and open. Many other switch states are possible in other topologies, which include forward, fly-back, SEPIC, Cuk, etc. The teachings of the present disclosure are also applicable to other control systems such as, but not limited to, motor control systems. The feedback ADC module 146 provides the state estimator module 108 feedback regarding the output voltage $V_{out}$ of the power stage module 104. The state estimator module 108 estimates the switch states based on the feedback received from the feedback ADC module 146.

The duty cycle module 112 calculates the duty cycle of PWM pulses that drive the switches of the power stage module 104. The duty cycle module 112 calculates the duty cycle based on the output of the summing module 110, which is a sum of the outputs of the parameter analyzer module 106, the state estimator module 108, and the stimulus signal if the stimulus signal is injected into the summing module 110. The summing module 114 adds the output of the duty cycle module 112 and the stimulus signal if the stimulus signal is injected into the summing module 114.

Additionally, the summing module 114 adds feedback of an estimated inductor current $l_{ind}$, which is estimated by the inductor current estimator module 144 and adjusted by a gain module 128 having a gain $K_{cancel}$. The feedback is used to cancel effects of $R_{damp}$ on the output voltage $V_{out}$, where $R_{damp} = R_{ind} + R_{on}$, and where $R_{on}$ is the on-resistance of the switches.

The gain normalization module 116 normalizes gain of the output of the summing module 114. The normalization module 116 receives an input from the auxiliary ADC module 142, which converts the input supply voltage $V_{in}$ into a digital format and outputs voltage feedforward information in the digital format to the gain normalization module 116. The gain normalization module 116 normalizes the gain of the output of the summing module 114 based on the voltage feedforward information received from the auxiliary ADC module 142.

The interpolator module 118 interpolates the output of the gain normalization module 116. The PWM module 140 generates the PWM pulses having the duty cycle determined by the duty cycle module 116, normalized by the gain normalization module 116, and interpolated by the interpolator module 118. The PWM pulses drive the switches according to the duty cycle.

Figure 2A:
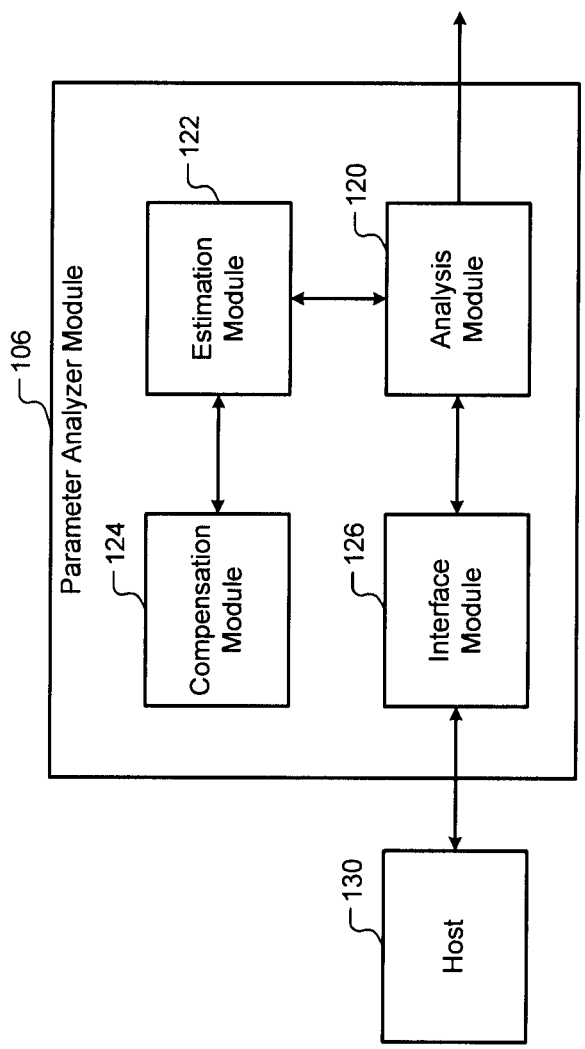
FIG. 2A is a functional block diagram of a parameter analyzer module.
Figure 2B:
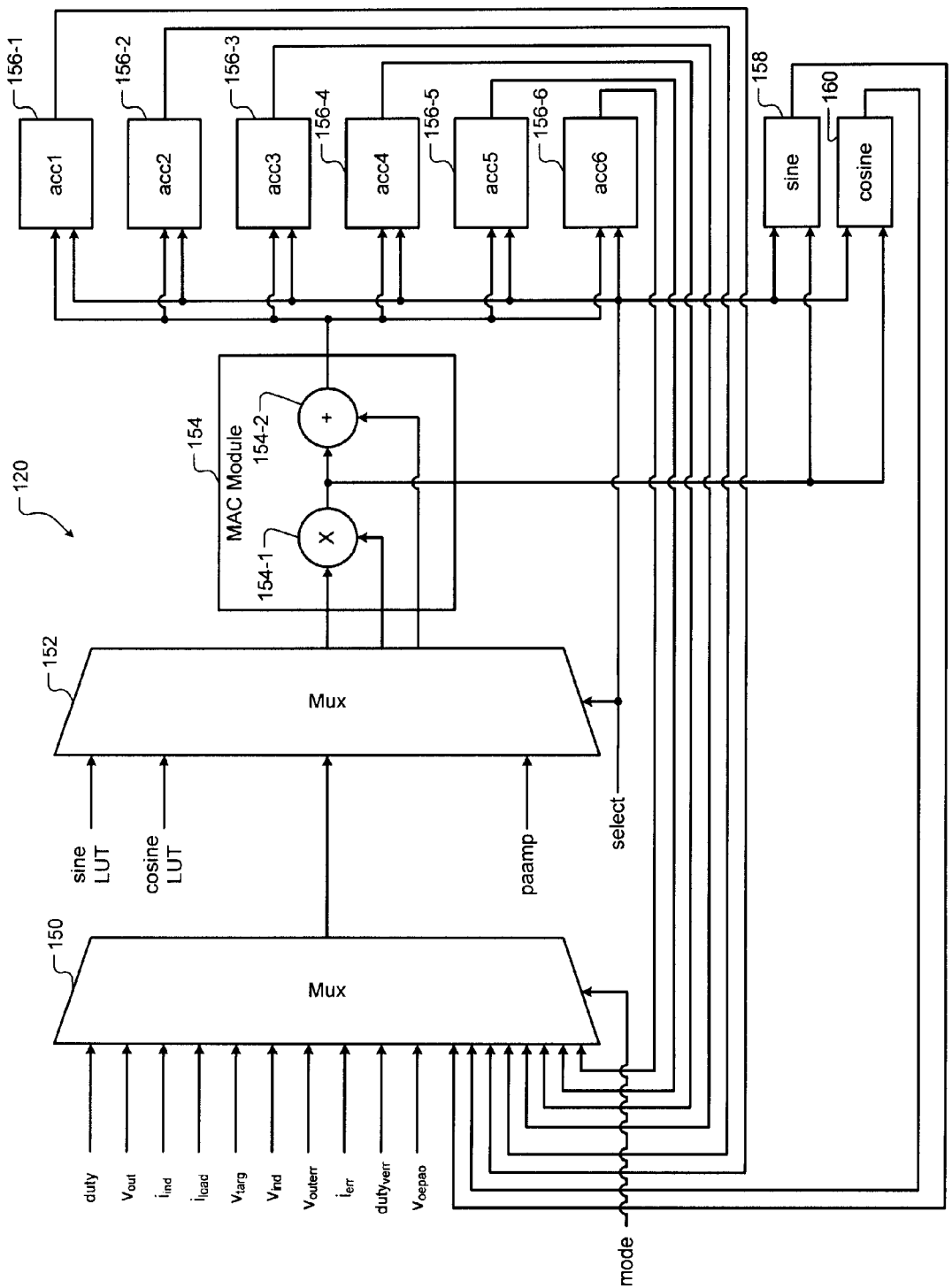
FIG. 2B is a functional block diagram of an analysis module.

Referring now to FIGS. 2A-2C, the parameter analyzer module 106 is described in detail. In FIG. 2A, the parameter analyzer module 106 includes an analysis module 120, a estimation module 122, a compensation module 124, and an interface module 126. The analysis module 120 analyzes the feedback and measures various power supply parameters as described below. The estimation module 122 generates control signals that control operations of various components of the analysis module 120 and estimates values of various power supply components as described below.

Additionally, the estimation module generates the stimulus signal from the sine and cosine tables 158, 160 as described in U.S. patent application Ser. No. 12/622,484 filed on Nov. 20, 2009, which is incorporated herein by reference in its entirety. The estimation module 122 determines whether to inject the stimulus signal into the summing module 110 or the summing module 114 depending on noise. The compensation module 124 performs adaptive compensation of various power supply parameters (e.g., gain, duty cycle, etc.) based on the analyses and measurements performed by the analysis module 120 and the estimation module 122.

The interface module 126 interfaces the analysis module 120 to a host 130. For example, the interface module 126 includes a PMbus interface that allows the host 130 to readback the power supply parameters measured by the analysis module 120 during manufacturing. Additionally, the interface module 126 allows the host 130 to read-back the power supply parameters remotely via a serial port, for example. Based on the read-back, the host 130 can remotely monitor, diagnose, and troubleshoot, and control the operation of the switching power supply 100.

In FIG. 2B, the analysis module 120 includes an input selection multiplexer 150; a multiplier selection multiplexer 152; a multiply-and-accumulate (MAC) module 154, a plurality of accumulators acc1 156-1, acc2 156-2, . . . , and acc6 156-6 (collectively accumulators 156); a sine table 158; and a cosine table 160. While only six accumulators 156 are shown in the example, any number of accumulators can be used depending on factors including the number of power supply parameters monitored/analyzed and the number of signals fed back from the power stage module 104 to the analysis module 120.

The input selection multiplexer 150 receives several inputs including power supply signals, outputs of the accumulators 156, and sine and cosine tables 158, 160. In the example shown, the power supply signals include signals received from the power stage module 104 and the duty cycle module 112. For example, the power supply signals include duty cycle (duty), output voltage $V_{out}$, inductor current $i_{ind}$, load current $i_{load}$, target voltage $v_{targ}$, inductor voltage $v_{ind}$, output voltage error $v_{outerr}$, etc.

The estimation module 122 generates mode signals that control the input selection multiplexer 150. In the example shown, the mode signals include 3 bits used to select one of eight modes in which the analysis module 120 can operate. The number of modes and the mode signals can vary depending on factors including the number of power supply parameters monitored/analyzed and the number of signals fed back to the analysis module 120.

In FIG. 2C, a table shows the eight modes in which the analysis module 120 can operate. The eight modes are numbered 0 through 7 and can be selected using the 3-bit mode signals generated by the estimation module 122. In mode 0, the analysis module 120 performs filtered read-back, which allows the host 130 to monitor key power supply parameters simultaneously via the PMbus. In mode 1, the analysis module 120 measures complex $v_{out}/v_{duty}$ at a test frequency with error analysis. In mode 2, the analysis module 120 measures complex $v_{ind}/i_{ind}$ and $v_{out}/i_{ind}$, which allow for measuring L, C, $R_{damp}$, etc. In mode 3, the analysis module 120 measures complex $v_{ind}/i_{ind}$ with error analysis, which allows for measuring L and $R_{damp}$. In mode 4, the analysis module 120 measures complex $v_{cap}/i_{ind}$ with error analysis. In mode 5, the analysis module 120 measures complex $v_{out}/i_{load}$ and $v_{out}/i_{ind}$, which allow for measuring the output impedance of the power stage module 104. In mode 6, the analysis module 120 measures estimated ripple in key power supply signals. In mode 7, the analysis module 120 performs transient error analysis.

In each mode, the input selection multiplexer 150 outputs selected power supply signals to the multiplier selection multiplexer 152. Additionally, in each mode, the input selection multiplexer 150 outputs to the multiplier selection multiplexer 152 one or more of the outputs received from the accumulators 156 and sine and cosine tables 158, 160. Depending on the selected mode, the estimation module 122 generates select signals that control the multiplier selection multiplexer 152, the accumulators 156, and the sine and cosine tables 158, 160. The select signals allow outputs of one or more accumulators 156 and the sine and cosine tables 158, 160 to be input to the input selection multiplexer 150. Additionally, depending on the selected mode, the select signals allow the multiplier selection multiplexer 152 to output signals that are relevant to the selected mode to the MAC module 154.

The MAC module 154 includes a multiplier 154-1 and an adder 154-2. The multiplier 154-1 multiplies a plurality of outputs of the multiplier selection multiplexer 152, which includes one or more of the power supply signals, one or more outputs of the accumulators 156, and the sine and cosine tables 158, 160. The adder 154-2 adds the output of the multiplier 154-1 and one or more outputs of the multiplier selection multiplexer 152. The output of the adder 154-2 (i.e., the output of the MAC module 154) is input to one or more accumulators 156 selected by the select signals.

In FIG. 2D, a table shows the values accumulated in the accumulators 156 in each mode. The values accumulated in the accumulators 156 are based on the outputs generated by the MAC module 154 in each mode. Depending on the selected mode, values accumulated in the accumulators 156 can be utilized by the estimation module 122 to measure various power supply parameters, perform error analysis, and so on.

For example, in mode 0, to allow monitoring of filtered read-back of average values of the power supply signals via the PMbus, duty cycle is accumulated in accumulator acc1 156-1; $v_{out}$ is accumulated in accumulator acc2 156-2; $i_{ind}$ is accumulated in accumulator acc3 156-3; a product of duty cycle and $i_{ind}$ is accumulated in accumulator acc4 156-4; $v_{in}$ is accumulated in accumulator acc5 156-5; and $i_{load}$ is accumulated in accumulator acc6 156-6.

In mode 1, to measure a transfer function of the power stage module 104, $(v_{duty}-v_{targ})$sin is accumulated in accumulator acc1 156-1; $(v_{duty}-v_{targ})\cos$ is accumulated in accumulator acc2 156-2; $(v_{out}-v_{targ})\sin$ is accumulated in accumulator acc3 156-3; $(v_{out}-v_{targ})\cos$ is accumulated in accumulator acc4 156-4; $(v_{duty}-v_{targ})^2$ is accumulated in accumulator acc5 156-5; and $(v_{out}-v_{targ})^2$ is accumulated in accumulator acc6 156-6.

In mode 2, to measure complex impedances of the power stage module 104, $(v_{duty}-v_{targ})\sin$ is accumulated in accumulator acc1 156-1; $(v_{duty}-v_{targ})\cos$ is accumulated in accumulator acc2 156-2; $i_{ind}*\sin$ is accumulated in accumulator acc3 156-3; $i_{ind}*\cos$ is accumulated in accumulator acc4 156-4; $(v_{out}-v_{targ})\sin$ is accumulated in accumulator acc5 156-5; and $(v_{out}-v_{targ})\cos$ is accumulated in accumulator acc6 156-6.

In mode 3, to measure the inductance L and $R_{damp}$ of the power stage module 104, $(v_{duty}-v_{out})\sin$ is accumulated in accumulator acc1 156-1; $(v_{duty}-v_{out})\cos$ is accumulated in accumulator acc2 156-2; $i_{ind}*\sin$ is accumulated in accumulator acc3 156-3; $i_{ind}*\cos$ is accumulated in accumulator acc4 156-4; $i_{ind}^2$ is accumulated in accumulator acc5 156-5; and $(v_{duty}-v_{out})^2$ is accumulated in accumulator acc6 156-6.

In mode 4, to measure capacitance C and $R_{cap}$ of the power stage module 104, $i_{ind}*\sin$ is accumulated in accumulator acc1 156-1; $i_{ind}*\cos$ is accumulated in accumulator acc2 156-2; $(v_{out}-v_{targ})\sin$ is accumulated in accumulator acc3 156-3; $(v_{out}-v_{targ})\cos$ is accumulated in accumulator acc4 156-4; $i_{ind}^2$ is accumulated in accumulator acc5 156-5; and $(v_{out}-v_{targ})^2$ is accumulated in accumulator acc6 156-6.

In mode 5, to analyze and measure output impedances (e.g., $Z_{out}$) of the power stage module 104, $i_{ind}*\sin$ is accumulated in accumulator acc1 156-1; $i_{ind}*\cos$ is accumulated in accumulator acc2 156-2; $(v_{out}-v_{targ})\sin$ is accumulated in accumulator acc3 156-3; $(v_{out}-v_{targ})\cos$ is accumulated in accumulator acc4 156-4; $i_{load}*\sin$ is accumulated in accumulator acc5 156-5; and $i_{load}*\cos$ is accumulated in accumulator acc6 156-6.

In mode 6, to analyze ripple in the power stage module 104, $v_{in}$ is accumulated in accumulator acc1 156-1; duty cycle is accumulated in accumulator acc2 156-2; absolute value of $v_{outripple}$ is accumulated in accumulator acc3 156-3; $i_{ind}$ is accumulated in accumulator acc4 156-4; absolute value of $i_{indripple}$ is accumulated in accumulator acc5 156-5; and $(v_{out}-v_{targ})^2$ is accumulated in accumulator acc6 156-6.

In mode 7, to analyze transient errors in the power stage module 104, $i_{ind}^2$ is accumulated in accumulator acc1 156-1; $(v_{out}-v_{targ})^2$ is accumulated in accumulator acc2 156-2; $(v_{duty}-v_{targ})^2$ is accumulated in accumulator acc3 156-3; $(v_{out}-v_{targ}-paout)^2$ (i.e., $(v_{out}-v_{cmd})^2$ is accumulated in accumulator acc4 156-4; absolute value of $(v_{out}-v_{targ})$ is accumulated in accumulator acc5 156-5; and $(i_{load}-i_{ind})^2$ is accumulated in accumulator acc6 156-6.

Referring now to FIGS. 3A-3M, the functions performed by the analysis module 120 and the estimation module 122 in each mode are described in detail. In mode 0, the analysis module 120 computes and accumulates in the accumulators 156 average values of the power supply parameters to allow monitoring of the power supply parameters via the PMbus. For example, in FIG. 3A, the analysis module 120 computes average duty cycle using the equation shown and accumulates the average duty cycle in accumulator acc1 156-1. The analysis module 120 computes average output voltage using the equation shown and accumulates the average output voltage in accumulator acc2 156-2. The analysis module 120 computes average inductor current using the equation shown and accumulates the average inductor current in accumulator acc3 156-3. The analysis module 120 computes approximate average input current using the equation shown and accumulates the approximate average input current in accumulator acc4 156-4. The analysis module 120 computes average input voltage using the equation shown and accumulates the average input voltage in accumulator acc5 156-5. The analysis module 120 computes average load current using the equation shown and accumulates the average load current in accumulator acc6 156-6. Simultaneous reading of the power supply parameters minimizes errors due to dynamic load events.

In mode 1, the analysis module 120 and the estimation module 122 measure the transfer function of the power stage module 104. For example, the analysis module 120 measures complex duty cycle and $v_{out}$ from sine burst excitation. Accuracy of measurement depends on time, amplitude, and noise. Delay is used for sine step to settle. Error analysis is used to insure measurement quality. For example, in FIG. 3B, measurements made by the analysis module 120 according to equations shown are accumulated in the accumulators 156. In FIG. 3C, measurements accumulated in the accumulators 156 are used by the estimation module 122 to compute the transfer function using the equations shown. In FIG. 3C, $T_{comp}$ denotes correction for delays including delays due to analog-to-digital conversion, computation, PWM, and switching. $w_1$ and $w_2$ are selected to optimize accuracy. The transfer function can be used to implement a Bode plot for the power stage module 104 to indicate performance of the power stage module 104.

In mode 2, the analysis module 120 and the estimation module 122 measure complex impedances of the power stage module 104. Specifically, the analysis module 120 measures complex inductor voltage, inductor current, and output voltage from sine burst excitation. In FIG. 3D, measurements made by the analysis module 120 are accumulated in the accumulators 156 as shown and are used by the estimation module 122 to compute the complex impedances using equations shown in FIG. 3E. Additionally, values of L, C, $R_{damp}$, and $R_{cap}$ can be determined by the estimation module 122 from the complex impedances using the equations shown in FIG. 3E. No error analysis is performed.

In mode 3, the analysis module 120 and the estimation module 122 measure the inductance L and $R_{damp}$ of the power stage module 104. Specifically, the analysis module 120 measures complex inductor voltage and inductor current from sine burst excitation. In FIG. 3F, measurements made by the analysis module 120 are accumulated in the accumulators 156 as shown and are used by the estimation module 122 to compute the inductance L and $R_{damp}$ using equations shown in FIG. 3G. Error analysis is used to insure measurement quality. $R_{damp}$ can be used to calculate losses in the power stage module 104. This is a preferred method of measuring the inductance L and $R_{damp}$.

In mode 4, the analysis module 120 and the estimation module 122 measure the capacitance C and $R_{cap}$ of the power stage module 104. Specifically, the analysis module 120 measures complex inductor voltage and output voltage from sine burst excitation. In FIG. 3H, measurements made by the analysis module 120 are accumulated in the accumulators 156 as shown and are used by the estimation module 122 to compute the capacitance C and $R_{cap}$ using equations shown in FIG. 3I. Error analysis is used to insure measurement quality. This is a preferred method of measuring the capacitance C and $R_{cap}$.

In mode 5, the analysis module 120 and the estimation module 122 measure the output impedances of the power stage module 104. Specifically, the estimation module 122 measures the output impedance $Z_{out}$ from AC load. The estimation module 122 can also measure load impedance $Z_{load}$ from sine burst excitation. In FIG. 3J, measurements made by the analysis module 120 are accumulated in the accumulators 156 as shown and are used by the estimation module 122 to compute $Z_{out}$ and $Z_{load}$ using equations shown in FIG. 3K. The absolute values shown in FIG. 3K are ripple measurements.

In mode 6, the analysis module 120 and the estimation module 122 analyze and measure ripple in the power stage module 104. Specifically, the analysis module 120 analyzes voltage and current ripple without using injection. The analysis module 120 analyzes the ripple using equations shown in FIG. 3L. The estimation module 122 estimates the amount of ripple.

In mode 7, the analysis module 120 and the estimation module 122 analyze transient error performance. Specifically, the analysis module 120 and/or the estimation module inject a square wave command or disturbance and measure output voltage error and an amount of control required to compensate the disturbance. This allows for iterative compensator optimization. The analysis module 120 analyzes the transient error performance using equations shown in FIG. 3M. The estimation module 122 estimates the transient error.

For example, for AC and DC optimization, the value accumulated in the accumulator acc2 156-2 is added to a product of a predetermined weight and a value accumulated in one of the accumulators acc3 156-3, acc4 156-4, and acc6 156-6. The value accumulated in accumulator acc3 156-3 measures the amount of control required when the stimulus signal is injected at the summing module 114 following the duty cycle module 112. The value accumulated in accumulator acc4 156-4 measures a voltage transition error when the stimulus signal is injected at the summing module 110 preceding the duty cycle module 112. The value accumulated in accumulator acc6 156-6 is used for load step optimization.

Based on the analyses and estimations made by the analysis module 120 and the estimation module 122, the compensation module 124 compensates the values of components and other parameters (e.g., duty cycle, gain, etc.) of the power supply. The analyses, estimations, and compensations are performed adaptively. Additionally, the analyses and estimates can be monitored simultaneously.

Figure 4:
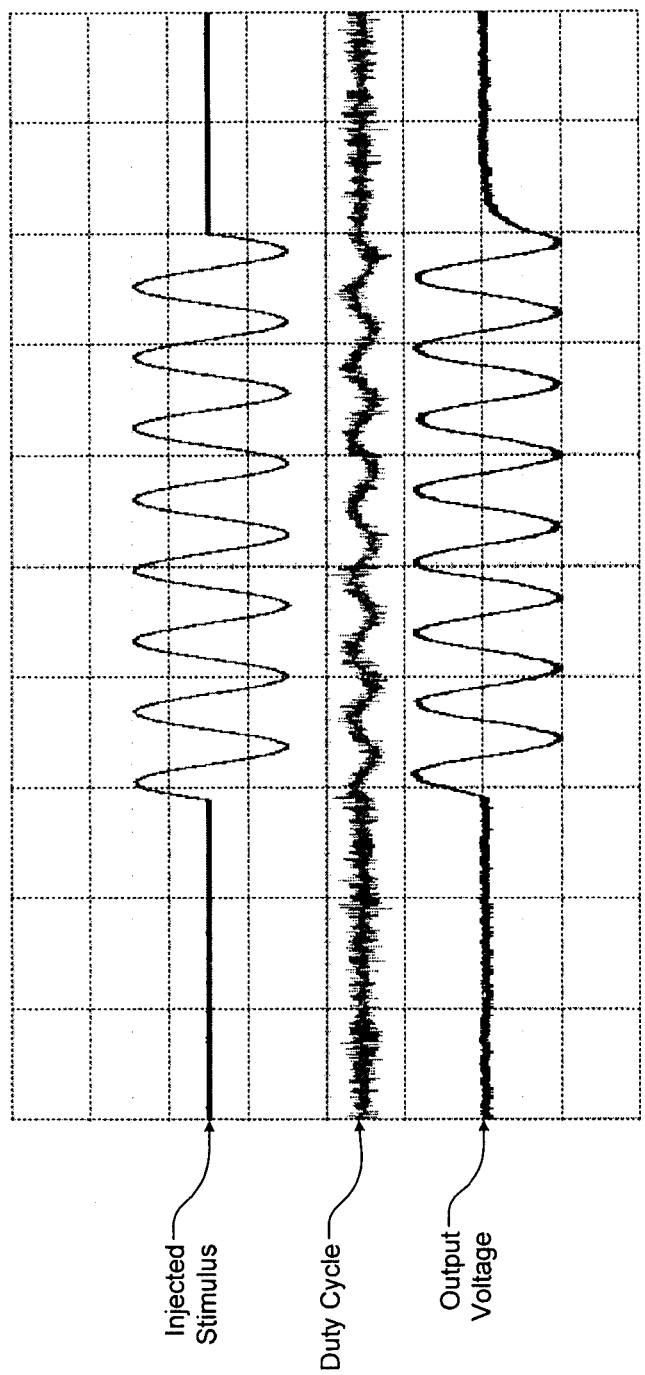
FIG. 4 depicts an injected reference, duty cycle, and output voltage of the switching power supply.

In FIG. 4, graphs of an injected stimulus signal, duty cycle, and output voltage are shown. The injected stimulus signal may be a sine/cosine signal as shown in the example or a square wave. The stimulus signal may be injected at the summing module 110 preceding the duty cycle module 112 or at the summing module 114 following the duty cycle module 112 depending on noise.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system comprising:
an input selection module that selects a plurality of input signals from a power supply based on a first set of control signals, wherein the input signals include a duty cycle signal and a plurality of current and voltage signals of the power supply;
a multiplier selection module that selects inputs from a sine generator and a cosine generator based on a second set of control signals;
a multiplier module that selectively multiplies one or more of the selected input signals by one of the inputs from the sine generator and the cosine generator to generate products;
an adding module that selectively adds the products to generate sums;
a plurality of accumulators that accumulates the sums based on the second set of control signals; and
an estimation module that generates the first and second sets of control signals and that estimates values of a plurality of components including an inductance, a capacitance, and a resistance in an output stage of the power supply based on the sums accumulated in the plurality of accumulators.

2. The system of claim 1 wherein the estimation module estimates an amount of ripple in the plurality of current and voltage signals of the power supply based on the sums accumulated in the plurality of accumulators.

3. The system of claim 1 wherein the estimation module estimates errors in the estimated values of the components of the power supply based on the sums accumulated in the plurality of accumulators.

4. The system of claim 3 further comprising a compensation module that adjusts values of a plurality of parameters of the power supply including a duty cycle and a gain of the power supply based on the estimated errors.

5. The system of claim 1 further comprising an interface module that allows a remote host to read the estimated values of the components of the power supply.

6. The system of claim 1 further comprising:
a power stage module that includes a plurality of switches and the components of the power supply, wherein the switches drive the components at a duty cycle; and
a duty cycle module that generates PWM pulses at the duty cycle,
wherein the estimation module estimates and sets the duty cycle based on the estimated values of the components of the power supply.

7. The system of claim 6 further wherein the estimation module injects a stimulus signal into a signal path between the estimation module and the duty cycle module or between the duty cycle module and the power stage module depending on noise, and estimates the values of the components based on the current and voltage signals of the power supply generated in response to the stimulus signal.

8. A method comprising:
selecting a plurality of input signals from a power supply based on a first set of control signals, wherein the input signals include a duty cycle signal and a plurality of current and voltage signals of the power supply;
selecting inputs from a sine generator and a cosine generator based on a second set of control signals;
selectively multiplying one or more of the selected input signals by one of the inputs from the sine generator and the cosine generator to generate products;
selectively adding the products to generate sums;
accumulating the sums in a plurality of accumulators selected based on the second set of control signals; and
estimating values of a plurality of components including an inductance, a capacitance, and a resistance in an output stage of the power supply based on the sums accumulated in the plurality of accumulators.

9. The method of claim 8 further comprising estimating an amount of ripple in the plurality of current and voltage signals of the power supply based on the sums accumulated in the plurality of accumulators.

10. The method of claim 8 further comprising estimating errors in the estimated values of the components of the power supply based on the sums accumulated in the plurality of accumulators.

11. The method of claim 10 further comprising adjusting values of a plurality of parameters of the power supply including a duty cycle and a gain of the power supply based on the estimated errors.

12. The method of claim 8 further comprising allowing a remote host to read the estimated values of the components of the power supply via an interface between the remote host and the power supply.

13. The method of claim 8 further comprising:
generating PWM pulses at a duty cycle;
driving a plurality of switches in a power stage of the power supply using the PWM pulses; and
estimating and setting the duty cycle based on the estimated values of the components of the power supply.

14. The method of claim 13 further comprising:
injecting a stimulus signal into a signal path between an estimation module estimating the values of the components of the power supply and a duty cycle module generating the duty cycle or between the duty cycle module and the power stage depending on noise; and
estimating the values of the components based on the current and voltage signals of the power supply generated in response to the stimulus signal.

15. A system comprising:
a first multiplexer that selects a plurality of input signals from a power supply based on a first set of control signals, wherein the input signals include a duty cycle signal and a plurality of current and voltage signals of the power supply;
a second multiplexer that selects inputs from a sine generator and a cosine generator based on a second set of control signals;
a multiplier that selectively multiplies one or more of the selected input signals by one of the inputs from the sine generator and the cosine generator to generate products;
an adder that selectively adds the products to generate sums;
a plurality of accumulators that accumulates the sums based on the second set of control signals; and
an estimator that generates the first and second sets of control signals and that estimates values of a plurality of components including an inductance, a capacitance, and a resistance in an output stage of the power supply based on the sums accumulated in the plurality of accumulators.

* * * * *